(12) United States Patent
Shen et al.

(10) Patent No.: US 11,966,678 B2
(45) Date of Patent: Apr. 23, 2024

(54) MODELLING TIMING BEHAVIOR USING AUGMENTED SENSITIVITY DATA FOR PHYSICAL PARAMETERS

(71) Applicant: Synopsys, Inc., Sunnyvale, CA (US)

(72) Inventors: Ruijing Shen, New York, NY (US); Li Ding, San Jose, CA (US)

(73) Assignee: SYNOPSYS, INC., Sunnyvale, CA (US)

( * ) Notice: Subject to any disclaimer, the term of this patent is extended or adjusted under 35 U.S.C. 154(b) by 64 days.

(21) Appl. No.: 17/540,774

(22) Filed: Dec. 2, 2021

(65) Prior Publication Data
US 2022/0171910 A1 Jun. 2, 2022

Related U.S. Application Data

(60) Provisional application No. 63/120,606, filed on Dec. 2, 2020.

(51) Int. Cl.
*G06F 30/3312* (2020.01)
*G06F 30/31* (2020.01)
*G06F 30/3315* (2020.01)
*G06F 119/12* (2020.01)

(52) U.S. Cl.
CPC .......... *G06F 30/3312* (2020.01); *G06F 30/31* (2020.01); *G06F 30/3315* (2020.01); *G06F 2119/12* (2020.01)

(58) Field of Classification Search
CPC .. G06F 30/3312; G06F 30/31; G06F 30/3315; G06F 2119/12; G06F 30/27; G06F 30/367; G06N 20/00
See application file for complete search history.

(56) References Cited

U.S. PATENT DOCUMENTS

| | | | | |
|---|---|---|---|---|
| 8,302,047 B2* | 10/2012 | Buss | ....................... | G10L 19/00 716/108 |
| 8,813,006 B1* | 8/2014 | Parameswaran | ...... | G06F 30/398 716/108 |
| 9,639,640 B1* | 5/2017 | Savithri | .............. | G06F 30/3312 |
| 10,073,934 B1* | 9/2018 | Keller | ................. | G06F 30/3312 |
| 10,185,795 B1* | 1/2019 | Keller | ................. | G06F 30/3312 |

(Continued)

OTHER PUBLICATIONS

P. Bastani, N. Callegari, L. Wang and M. S. Abadir, "Diagnosis of design-silicon timing mismatch with feature encoding and importance ranking—the methodology explained," *2008 IEEE International Test Conference*, Santa Clara, CA, 2008, pp. 1-10, doi: 10.1109/Test.2008.4700588.

(Continued)

*Primary Examiner* — Nha T Nguyen
(74) *Attorney, Agent, or Firm* — Lewis Roca Rothgerber Christie LLP

(57) ABSTRACT

A method for modelling timing behavior using augmented sensitivity data for physical parameters is disclosed. The method includes acquiring timing library data and sensitivity data for a physical parameter associated with a circuit design, generating a timing behavior model for the circuit design based on the timing library data and sensitivity data for the physical parameter, and storing the timing behavior model. The timing behavior model reduces a difference between a current known best measurement associated with the circuit design and a static timing analysis timing for the circuit design.

20 Claims, 6 Drawing Sheets

(56) References Cited

U.S. PATENT DOCUMENTS

| | | | | |
|---|---|---|---|---|
| 10,275,554 | B1* | 4/2019 | Chetin | G06F 30/367 |
| 10,289,774 | B1* | 5/2019 | Yadav | G06F 30/3312 |
| 10,345,721 | B1* | 7/2019 | Cao | G03F 7/70616 |
| 11,641,155 | B2* | 5/2023 | Ayati | H02M 1/12 |
| | | | | 307/105 |
| 2004/0002844 | A1* | 1/2004 | Jess | G06F 30/367 |
| | | | | 703/14 |
| 2006/0206845 | A1* | 9/2006 | Rao | G06F 30/39 |
| | | | | 703/19 |
| 2007/0156367 | A1* | 7/2007 | Kucukcakar | G01R 31/2894 |
| | | | | 702/123 |
| 2013/0227510 | A1* | 8/2013 | Katz | G06F 30/3312 |
| | | | | 716/113 |
| 2016/0140271 | A1* | 5/2016 | Chen | G06F 30/30 |
| | | | | 716/103 |
| 2018/0004880 | A1* | 1/2018 | Sattiraju | G06F 30/367 |
| 2018/0365364 | A1* | 12/2018 | Kim | G06F 30/392 |
| 2020/0320366 | A1* | 10/2020 | Wang | G06N 3/08 |
| 2021/0165941 | A1* | 6/2021 | Landman | G06F 30/3315 |
| 2021/0173993 | A1* | 6/2021 | Raman | G06F 30/27 |
| 2021/0182466 | A1* | 6/2021 | Le | G06N 3/08 |
| 2022/0171910 | A1* | 6/2022 | Shen | G06F 30/3315 |

OTHER PUBLICATIONS

T. H. Choi, H. Jeong, Y. Yang, J. Park and S. Jung, "SRAM Operational Mismatch Corner Model for Efficient Circuit Design and Yield Analysis," in *IEEE Transactions on Circuits and Systems I: Regular Papers*, vol. 64, No. 8, pp. 2063-2072, Aug. 2017, doi: 10.1109/TCS1.2017.2685634.

Foty, "Effective MOSFET modeling for Spice circuit simulation," Northcon/98. Conference Proceedings (Cat. no. 98CH36264), Seattle, WA, USA, 1998, pp. 228-235, doi: 10.1109/NORTHC.1998. 731541.

H. Hong and L. Lin, "Accurate and Fast On-Wafer Test Circuitry for Device Array Characterization in Wafer Acceptance Test," in *IEEE Transactions on Circuits and Systems I: Regular Papers*, vol. 66, No. 9, pp. 3467-3479, Sep. 2019, doi: 10.1109/TC51.2019. 2924251.

Jajodia, R. et al., "Applications of Test Techniques for Improving Silicon to Pre-Silicon Timing Correlations," *2019 IEEE International Test Conference India (ITC India)*, Bangalore, India, 2019, pp. 1-8, doi: 10.1109/ITCIndia46717.2019.8979800.

Shah, R. Nayyar and A. Sinha, "Silicon Proven Tiing Sign-off Methodology using Hazard-Free Robust Path Delay Test," in *IEEE Design & Test*, 10.1109/MDAT/2020.2968253.

* cited by examiner

MODELLING TIMING BEHAVIOR USING AUGMENTED SENSITIVITY DATA FOR PHYSICAL PARAMETERS

CROSS-REFERENCE TO RELATED APPLICATIONS

The present application claims the benefit under 35 U.S.C. § 119(e) of U.S. Provisional Patent Application No. 63/120,606 filed on Dec. 2, 2020, which is incorporated herein by reference in its entirety for all purposes.

TECHNICAL FIELD

The present disclosure relates to electronic design automation. In particular, the present disclosure relates to modelling timing behavior using augmented sensitivity data for physical parameters.

BACKGROUND

Semiconductor device fabrication is a costly process. Design and manufacturing cycles for development of advanced technology nodes can require extensive amounts of time to complete. Therefore, achieving first-time success at silicon production time can result in significant time and money savings for integrated circuit (IC) design companies. EDA tools may use a set of models (e.g., in the form of cell libraries) at different stages of the design and manufacturing cycle, any of which can result in problems that reduce the likelihood of first-time success in silicon production. But by achieving correlation between the set of models and best known measurements, the likelihood of success can be improved.

SUMMARY

In one aspect, a method includes acquiring timing library data and sensitivity data for a physical parameter associated with a circuit cell, generating a timing behavior model for the circuit cell based on the timing library data and sensitivity data for the physical parameter, and generating updated timing data using the timing behavior model.

In one aspect, a system includes a memory storing instructions, and a processor, coupled with the memory and to execute the instructions. The instructions when executed cause the processor to acquire timing library data and sensitivity data for a physical parameter associated with a circuit cell, generate a timing behavior model for the circuit cell based on the timing library data and sensitivity data for the physical parameter, and generate updated timing data using the timing behavior model.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
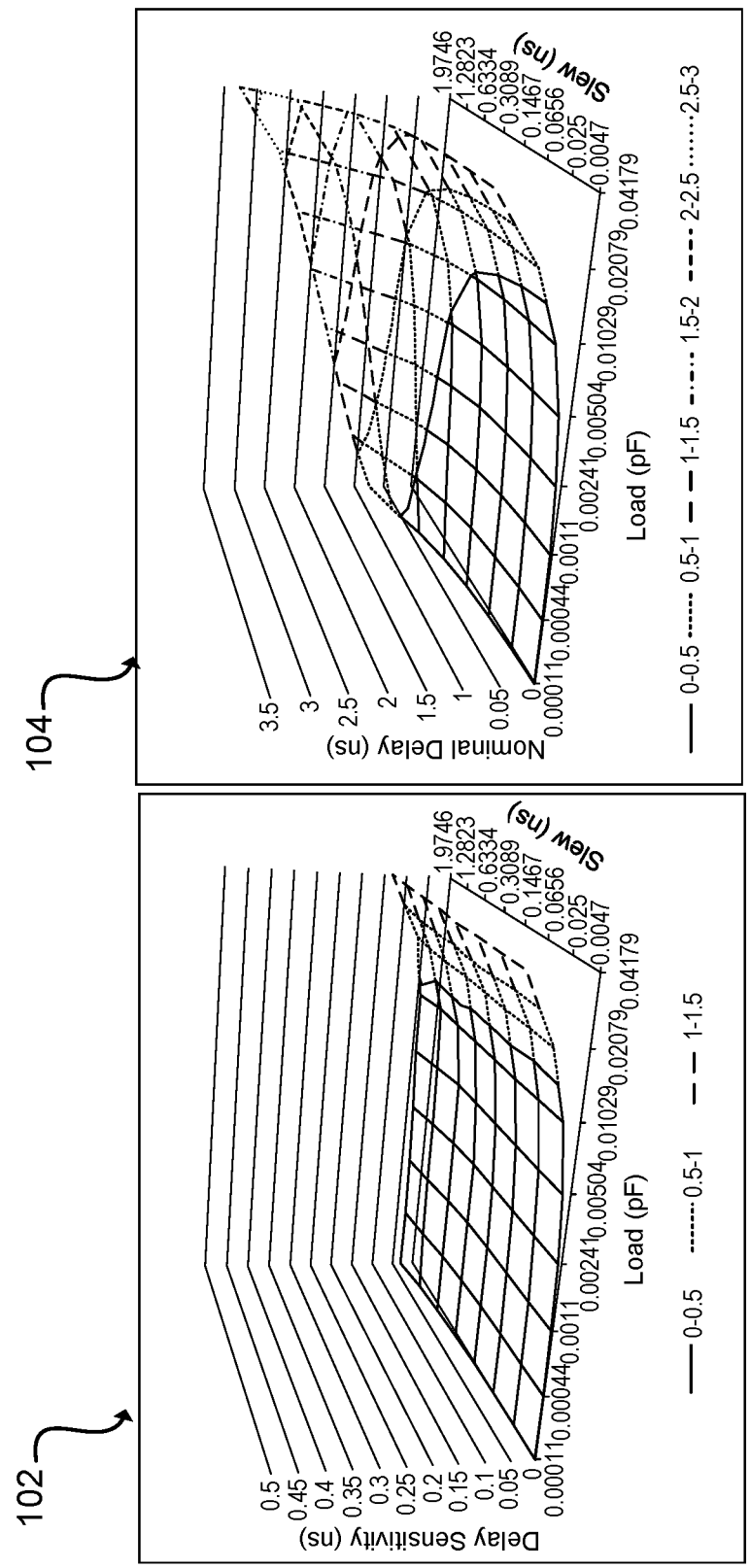
FIG. 1 is a schematic that shows delay and delay sensitivity for a physical parameter, in accordance with an embodiment of the present disclosure.

Aspects of the present disclosure relate to modelling timing behavior using augmented sensitivity data for a physical parameter.

Design works (i.e., synthesis, place and route, signoff, engineering change order (ECO)) are based on a set of fixed models, usually in the form of cell libraries. Designers often face model changes during a design cycle where the fixed models are not correlating well with golden models. Golden model may include a golden measurement that represents current known best measurement for a given parameter. For example, a golden frequency may represent a frequency at which a ring oscillator oscillates.

For example, when SPICE process design kit (PDK) is updated but new libraries are not yet available, or when actual silicon measurements of test chips (fresh or aged) are different from the fixed model. The gap between libraries and golden models has been a key challenge for design optimization and yield optimization. Recharacterizing (regenerating) libraries based on updated measurements is time consuming. It is desired that electronic design automation (EDA) tools model actual silicon behavior as much as possible in a pre-silicon phase, which reduces turn-around time (TAT) and reduces redesign efforts without losing accuracy.

Empirical timing derates may be used for model changes. Empirical timing derates may adjust delay values for individual timing arcs of a cell to model the effects of varying conditions. Timing derates are generated for only a few cells used in a circuit (e.g., a ring oscillator (RO)). Then, heuristics are used to determine derates for other cells in the library.

The approaches described herein model and extract shifts in physical parameters between golden and existing models, then apply such physical parameters shifts in timing analysis. The physical parameters include front-end-of-line (FEOL) transistor parameters (e.g., mobility, threshold voltage, FIN dimensions, and the like), middle-of-line (MOL), and back-end-of-line (BEOL) (wire and via) parameters (e.g., capacitance and resistance).

Embodiments disclosed herein solve the problem of a lack of correlation between fixed models and golden models without the lengthy process of regenerating libraries, and overcome the limitation of timing derates as described below.

Advantages of the present disclosure include, but are not limited to, reducing manufacturing time/cost and impact of physical parameters on design/yield, applying the calibration database to cell with and without golden measurements, and improving static timing analysis (STA) correlation.

The approaches described herein improve STA to silicon correlation with silicon feedback. In some embodiments, the shifts in physical parameters between golden and existing models are modelled and extracted by applying machine learning technology on golden feedback for a learning circuit. Learning circuit may refer to a small circuit such as a ring oscillator (RO), a collection of small circuits, or a collection of timing paths. The learning circuit is used to generate the calibration database by applying machine learning techniques (e.g., linear regression technique, vector regression, multivariate regression). Then, a STA tool is calibrated to reduce a gap between STA timing and golden measurements. A calibration database that includes updated values for a physical parameter is generated. The calibration database calibrates STA behavior based on silicon data.

Timing derate based approaches can only correct mean of error distribution. The approaches described improve both mean and standard deviation of error distribution. Timing derate based approaches are only applicable to cells with golden measurements. The approaches described herein can be applied to all cells. Even for the cells with golden measurements (e.g., golden silicon measurements), timing derates are only supported at a library cell level. However, different timing arcs of the same cell may have very different derate values. In addition, timing derates may not be accurate because timing derates are not slew/load dependent.

The approaches described herein provide improved results over timing derate based approaches, since the model mismatch can be accurately captured for each individual cell, as well as their accumulated impact at the path and full-chip level.

In some embodiments, the calibration database may be developed using updated parameter values for the learning circuit and applied to other circuits regardless whether or not the cells of the other circuits have golden measurements.

FIG. 1 is a schematic that shows response surfaces of a delay and a delay sensitivity for a physical parameter (fin height) with respect to cell input slew and load capacitance, in accordance with an embodiment of the present disclosure. Schematic 102 shows the sensitivity of the delay to the slew and load. Schematic 104 shows a nominal delay with respect to the slew and load. Thus, both of the sensitivity of the delay and nominal delay are slew and load dependent and timing derates techniques that are not slew and/or load dependent may lead to inaccurate timing derates.

Figure 2:
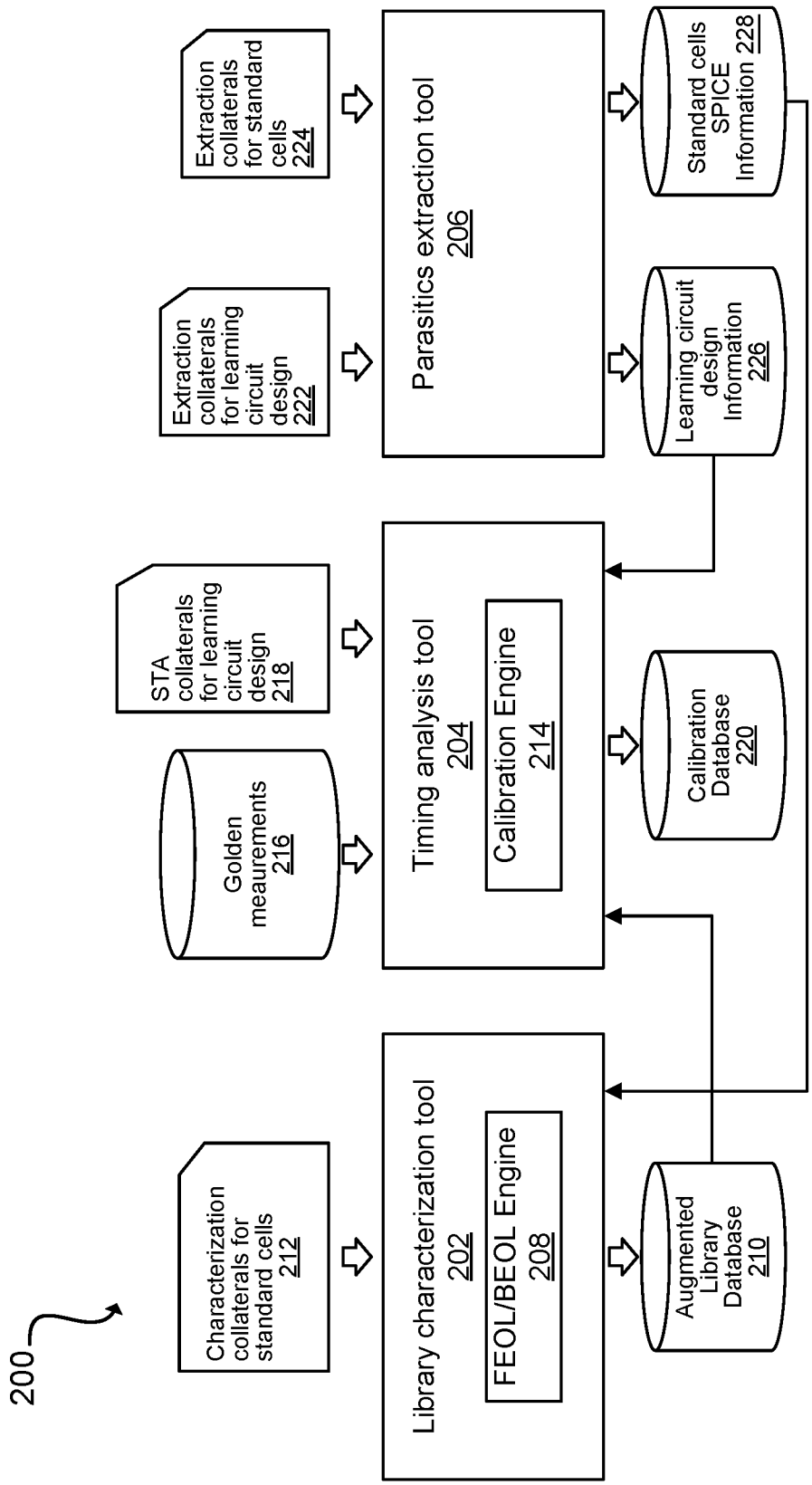
FIG. 2 is a schematic that shows a block diagram of a system for modelling timing behavior, in accordance with an embodiment of the present disclosure.

FIG. 2 is a schematic that shows a block diagram of a system 200 for modelling timing behavior, in accordance with an embodiment of the present disclosure. System 200 includes a library characterization tool 202, a timing analysis tool 204, a parasitics extraction tool 206, an augmented library database 210, a calibration database 220, a learning circuit design information database 226, a standard (STD) cells information database (e.g., STD SPICE database) 228, and a golden measurements database 216.

The library characterization tool 202 includes an FEOL/BEOL engine 208. The FEOL/BEOL engine 208 may generate the augmented library database 210 based on characterization collaterals for STD cells 212. Characterization collaterals for STD cells 212 may include models such as SPICE models, SPICE sub-circuits, and simulation engines. The augmented library database 210 includes parameters in SPICE model (e.g., physical parameters) that impact STD cell delay/slew/pin-cap. For example, augmented library database 210 includes sensitivity tables for both delay and slew, sensitivity values for rise and fall pin caps including a percentage change in pin cap to be used together with C1C2 (i.e., two capacitances are used to represent a pin's cap in a receiver model) or C1CN (i.e., N capacitances are used to represent the pin's cap in the receiver model) and a value per C1C2 or C1CN table. In some aspects, the SPICE model can be simulated at different corners, for example TT (typical) corner, SS (slow) corner, and the like.

The physical parameter may include one or more FEOL parameters and one or more BEOL parameters. FEOL parameters may include offset for channel length (x1), fin height (hfin), fin thickness (tfin), multiplier for mobility degradation (u0mult), equivalent oxide thickness (eot), physical oxide thickness (toxp), threshold voltage shift (delvtrand), multiplier for the drain current (ids0mult). BEOL parameters may include all metal layers, assuming R and C within a layer are inversely correlated. SPICE simulations are used to collect timing sensitivities corresponding to physical parameters change and are stored in the augmented library database 210.

In some embodiments, the timing analysis tool 204 includes a calibration engine 214. The parasitics extraction tool 206 extracts collaterals for the learning circuit design 222 and collaterals for STD cells 224. The collaterals for STD cells 224 may include files (e.g., data associated with the learning circuit design provided by the user in form of technical files and design files) used by parasitics extraction tools 206. Parasitics extraction tool 206 may extract the resistance and/or capacitance and provide them to timing analysis tool 204 and library characterization tool 202. In some embodiments, parasitics extraction tool 206 may extract the resistance and/or capacitance with or without layer information. In some aspects, parasitics extraction tool 206 may provide the resistance and/or capacitance data with layer information for the FEOL/BEOL engine 208 when BEOL calculation are performed.

Golden measurements database 216 may store measurements for one or more learning circuits. For example, the golden measurements database 216 may store measurements of sample frequencies for a ring oscillator (i.e., when the learning circuit is a ring oscillator circuit). The frequency may be a golden frequency that is a frequency at which the ring oscillator oscillates. The golden measurements database 216 may store measurements for one or more types of the same learning circuit. For example, for a given circuit, the golden measurement database 216 may store measurements for PMOS type circuit and NMOS type circuit corresponding to the given circuit.

Calibration engine 214 receives golden measurements from golden measurements database 216, STA collaterals for the learning circuit design 218, learning circuit design information 226, and sensitivity data from the augmented library database 210. STA collaterals may include Verilog files, libraries files, constraints, and/or other data used by the timing analysis tool 204. The calibration engine 214 uses the augmented library database 210 to generate calibration database 220.

In some embodiments, calibration engine 214 calibrates physical device (e.g., transistor) and interconnect parameters to improve STA correlation with golden measurements (e.g., from silicon or new SPICE model). Physical device and interconnect parameter mismatches are derived from the golden measurement data. The physical parameter mismatches are then used to accurately compute timing derate values for each cell type and for each timing arc of each cell as described further below.

In STA analysis tool, each cell delay and/or output transition may be modeled as function of parameter change based on the augmented library database 210. For example, the delay may be modelled as a cell delay function model:

$$\text{Delay}(param_1, param_2, \ldots, param_n) = \text{Delay}_{nominal} + \sum f_i(param_i)$$

and the transition may be modelled as a cell transition function model as follows:

$$\text{Transition}(param_1, param_2, \ldots,$$
$$param_n = \text{Transition}_{nominal} + \sum f_i(param_i)$$

In the above equations, $f_i$ can be a polynomial fitting function based on library sensitivity data per parameter (e.g., stored in augmented library database 210). Calibration is done in calculation engine 214 to produce accurate composite current source (CCS) timing and CCS noise data without having to characterize their sensitivities with respect to physical parameters in order to minimize library size overhead.

Figure 3:
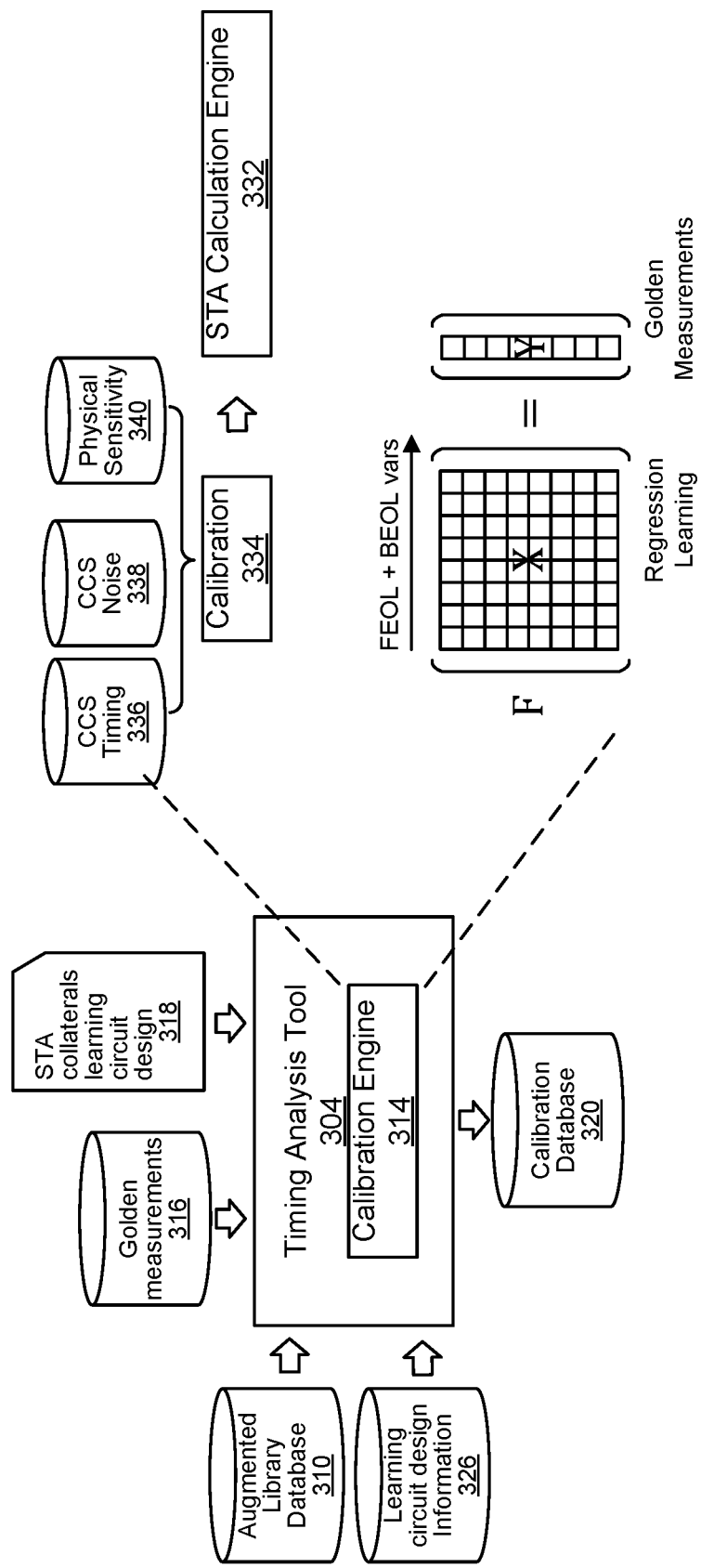
FIG. 3 is a schematic that shows a framework of a calibration engine of the system for modelling timing behavior, in accordance with an embodiment of the present disclosure.

FIG. 3 is a schematic that shows a framework of a calibration engine 314, in accordance with an embodiment of the present disclosure. Calibration engine 314 of a timing analysis tool 304 may build a calibration database 320 based on data received from an augmented library database 310, a learning circuit design information database 326, a golden measurements database 316, and STA collaterals learning circuit design information 318. Calibration engine 314 includes a CCS timing database 336, a CCS noise database 338, and a physical sensitivity database 340. Calibration 334 is done based on data from CCS timing database 336, CCS noise database 338, and physical sensitivity database 340. The STA calculation engine 332 may estimate the timing results STA arrival time/frequency that is used by the calibration engine 314. As discussed further below, calibration 334 may be based on regression learning techniques.

In some embodiments, learning circuit (e.g., RO) types to collect golden data may have different groups of voltage threshold (Vth) types, P/N ratio, size, cell types and different metal layers to provide a wide variety of training data. For example, desired learning circuit types can include FEOL coverage and BEOL coverage. The FEOL coverage may include Vth type (e.g., low Vth (LVT), standard (SVT), ultra-low (ULVT)), P/N ratio, size (e.g., X1, X4), cell type (e.g., INV, ND2, NR2), and fanout number (e.g., 1/2/4/8). The BEOL coverage may include different metal layers (e.g., metal 1, . . . , metal 12). In some embodiments, a first learning circuit may be used to obtain calibration data for LVT devices (e.g., LVT inverters) and a second learning circuit may be used to obtain calibration data for SVT devices (e.g., SVT inverters). Thus, the calibration database may include coverage for different FEOL devices. Similarly, a learning circuit may have a lot of metal 1 layer usage while another may have a lot of metal 2 layer usage, and the like to have expand the BEOL coverage.

Table 1 shows example combinations of learning circuit types that are covered. Table 1 shows a total combination count of 33.

TABLE 1 combinations of RO types

| Cell_type | Size | Vth | fanout | BEOL | combination |
|---|---|---|---|---|---|
| 4 | 2 | LVT | 2 | 1 | 16 |
| 1 | 1 | (7-1) | 1 | 1 | 6 |
| 1 | 1 | 1 | 1 | Metal (12-1) | 11 |

Using STA timing propagation, once cell-based delay/output transition functions of physical parameters are built up, path arrival time can be modeled as function of physical parameters. Given different golden measurement path combinations (e.g., golden frequency/arrival time), the following machine learning training system can be built:

$$F(X) = Y$$

where F is learning circuit path-based arrival function of $X=[param_1, param_2, \ldots, param_n]$. Y represent the golden measurements from different learning circuit types:

$$Y = [arrival_1, arrival_2, \ldots, arrival_m]^T$$

After machine learning has been applied, vector X is fitted such that given the physical parameter values, STA arrival time/frequency of learning circuit designs can get as close to golden data as possible. The physical parameter values are stored (e.g., in a calibration database). The calibration database can be applied to any design with the same libraries as the learning circuit designs. The physical parameter value is retrieved from the database and used for another circuit design that has the same library as the learning circuit design. Since it's based on physical parameter shifts, the post-calibration pre-silicon timing are closer to post-silicon results compared to pre-calibration.

Figure 4:
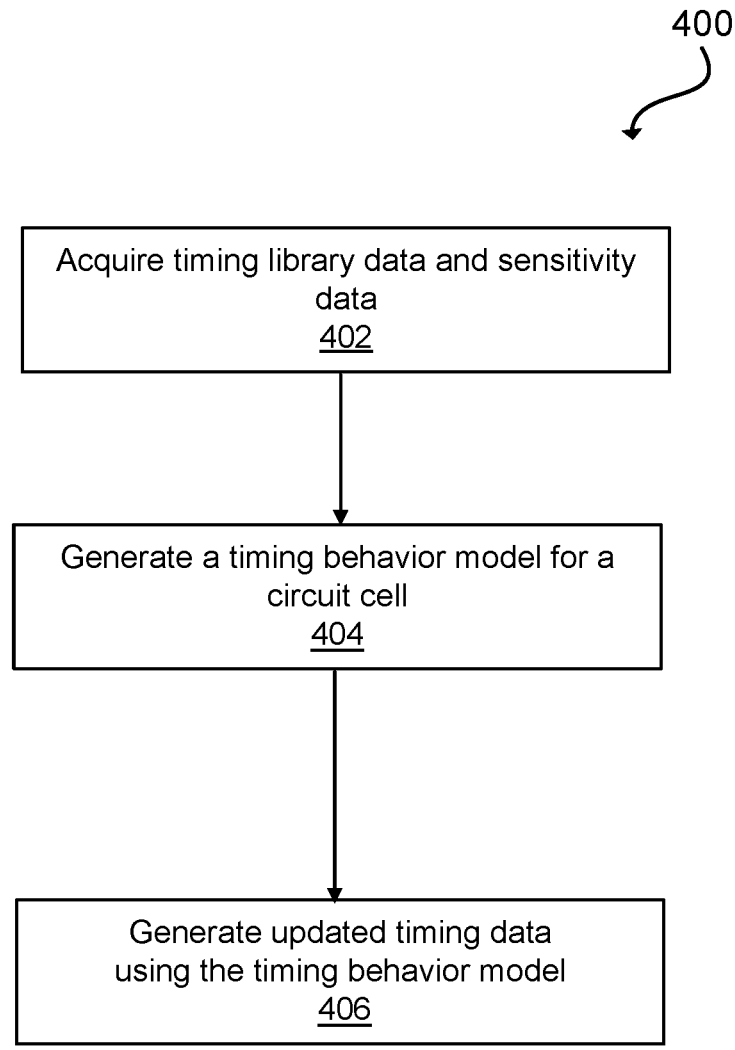
FIG. 4 depicts a flowchart for a method for modelling timing behavior using augmented sensitivity data for the physical parameter, in accordance with an embodiment of the present disclosure.

FIG. 4 is a flowchart for a method 400 for modelling timing behavior using augmented sensitivity data for physical parameters, in accordance with an embodiment of the present disclosure.

In 402, timing library data and sensitivity data for one or more physical parameters associated with a circuit design are acquired. The circuit design may be a learning circuit (e.g., RO circuit). In some embodiments, a user input to select the one or more physical parameters may be received. The sensitivity data associated with the selected one or more physical parameters may be determined using a SPICE model.

In 404, a timing behavior model for the circuit design based on the timing library data and sensitivity data for the physical parameter is generated. In some aspects, the timing behavior model is generated using a machine learning training system (e.g., linear regression technique) as a function of arrival functions and golden measurement for one or more types of the circuit design. The timing behavior model reduces a difference between a current known best measurement associated with the circuit design and a static timing analysis timing for the circuit design. In some aspects, the timing behavior model may be generated by receiving one or more physical parameter change from a user (e.g., a change in the threshold voltage of 10 mV).

In 406, updated timing data using the timing behavior model may be generated. The timing behavior model may be stored (e.g., in a calibration database). The timing behavior model may include updated values of the physical parameter. The calibration database may be configured to be applied to another circuit design.

In some embodiments, step 402, step 404, step 406 may be repeated for a plurality of learning circuits. In some aspects, the plurality of learning circuits may include a plurality of type of the same learning circuit.

In some embodiments, design data associated with an additional circuit design may be received. In some aspects, the additional circuit design may be for a large circuit (i.e., may contain a large number of blocks compared to the learning circuit). Timing analysis (e.g., static timing analysis) may be performed for the additional circuit design using the calibration database. In some aspects, updated values for one or more physical parameters for one or more cells of the additional circuit design may be retrieved from the calibration database.

In some embodiments, design data associated with a circuit design may be received. One or more physical parameter values may be retrieved from the calibration database. For example, one or more physical parameter values for each cell of the circuit design may be retrieved. In some embodiments, static analysis timing for the circuit design may be performed using the one or more physical parameter values retrieved from the calibration database.

In some embodiments, two physical parameters and four types of RO circuits are used. The physical parameters (e.g., selected by the user) are threshold voltage (Vth) and multiplier for Ids (ids0). As described previously herein, the physical parameter may be for each device type depending on coverage desired by the user (e.g., PMOS, NMOS, Vth type). The STD cell physical sensitivities from the augmented library database for delay sensitivity impact of fin height (hfin) are shown in table 2 and table 3.

TABLE 2

| Delay sensitivity | | |
|---|---|---|
| $I_{ds}$ shift + 10% | Slew 1 | Slew 2 |
| Cap 1 | −0.1 | −0.2 |
| Cap 2 | −0.3 | −0.4 |

TABLE 3

| Delay sensitivity | | |
|---|---|---|
| $I_{ds}$ shift − 10% | Slew 1 | Slew 2 |
| Cap 1 | 0.1 | 0.2 |
| Cap 2 | 0.3 | 0.4 |

STA period function of parameter sensitivity based on the augmented library database and STA calculation engine are shown in table 4.

TABLE 4

| STA period function of parameter sensitivity | | |
|---|---|---|
| | Golden period | Period function of physical parameter sensitivity |
| RO_type_1 | 100.0 | f_1 (vth, ids0) |
| RO_type_2 | 50.0 | f_2 (vth, ids0) |

TABLE 4-continued

| STA period function of parameter sensitivity | | |
|---|---|---|
| | Golden period | Period function of physical parameter sensitivity |
| RO_type_3 | 200.0 | f_3 (vth, ids0) |
| RO_type_4 | 150.0 | f_4 (vth, ids0) |

Then F(x)=Y is as follows in this example:

$$\begin{bmatrix} f_1(vth, ids0) \\ f_2(vth, ids0) \\ f_3(vth, ids0) \\ f_4(vth, ids0) \end{bmatrix} = \begin{bmatrix} 100.0 \\ 50.0 \\ 200.0 \\ 150.0 \end{bmatrix}$$

After machine learning, the extracted physical parameter values are stored in the calibration database (e.g., calibration database 220, calibration database 320). The calibration database can be used for different applications: SPICE to silicon difference (S2S) (i.e., optimizing design for silicon), SPICE to aged silicon difference (aged S2S) (i.e., accurate modeling of aging effects), and SPICE version to version difference (SPICE v2v) (i.e., turn-around time reduction).

For S2S and aged S2S applications, there can be several usage models for the user depending on the availability of silicon data. For example, models may include a test chip model, a premium production model, and a low cost production model. The test chip model includes all types of the learning circuit (e.g., all types of the RO design). The test chip model may use limited measurements (e.g., 100) from few wafers (e.g., 1-3 wafers). In one example, the test chip model may use a limited number of independent variables (e.g., physical parameters). The premium production model includes all available types of the learning circuit (e.g., all types of the RO design (10 K to 100 K)). The premium production model may be based on multi-parameters learning. The low cost production model may use a reduced set of learning circuits (e.g., 10 K-100 K samples of RO designs). The low cost production may be based on multi-parameters learning. For SPICE version-to-version difference, usage models are wider since it may be easier to get SPICE simulation-based data.

Figure 5:
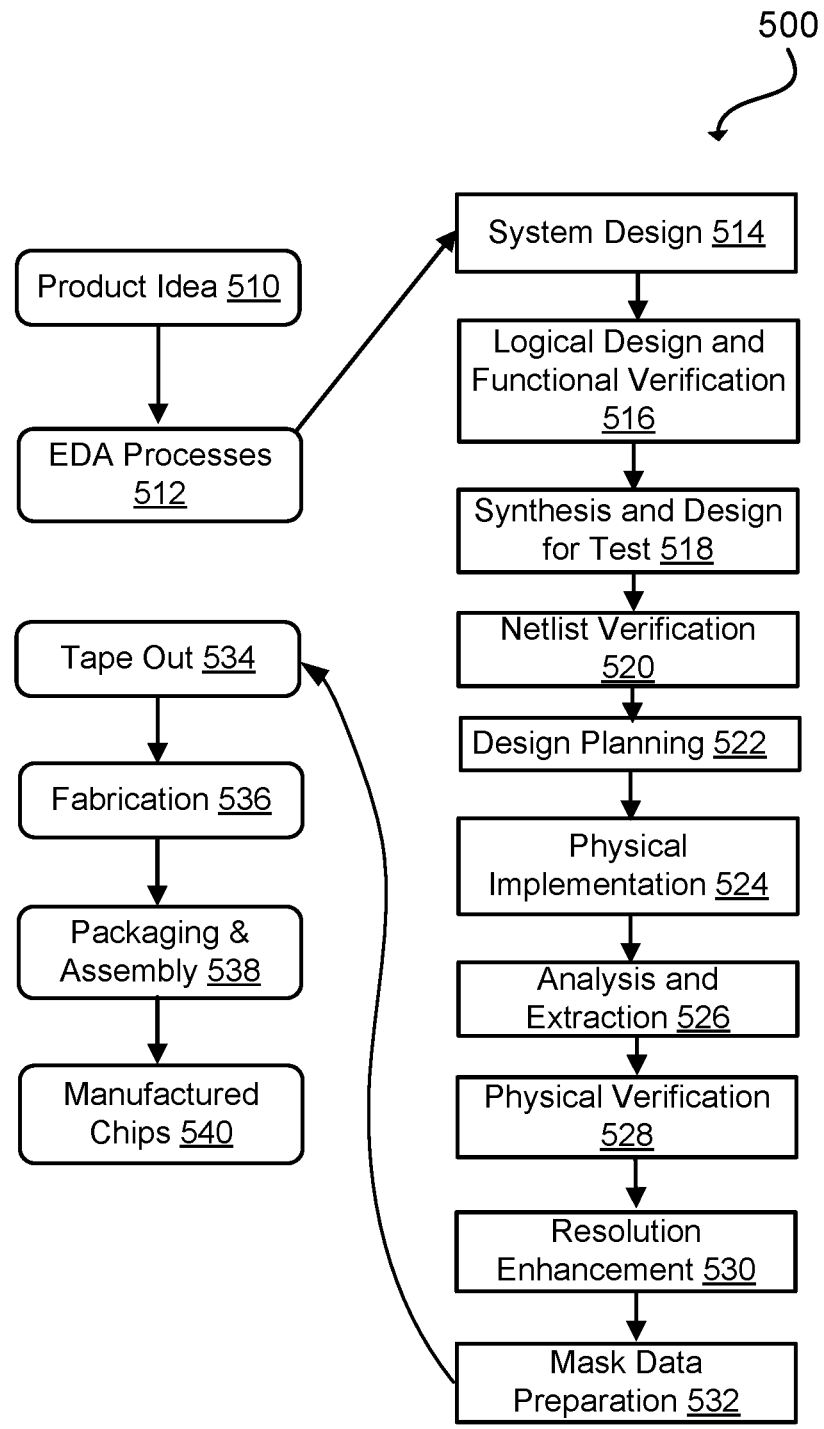
FIG. 5 depicts a flowchart of various processes used during the design and manufacture of an integrated circuit, in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described may be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Figure 6:
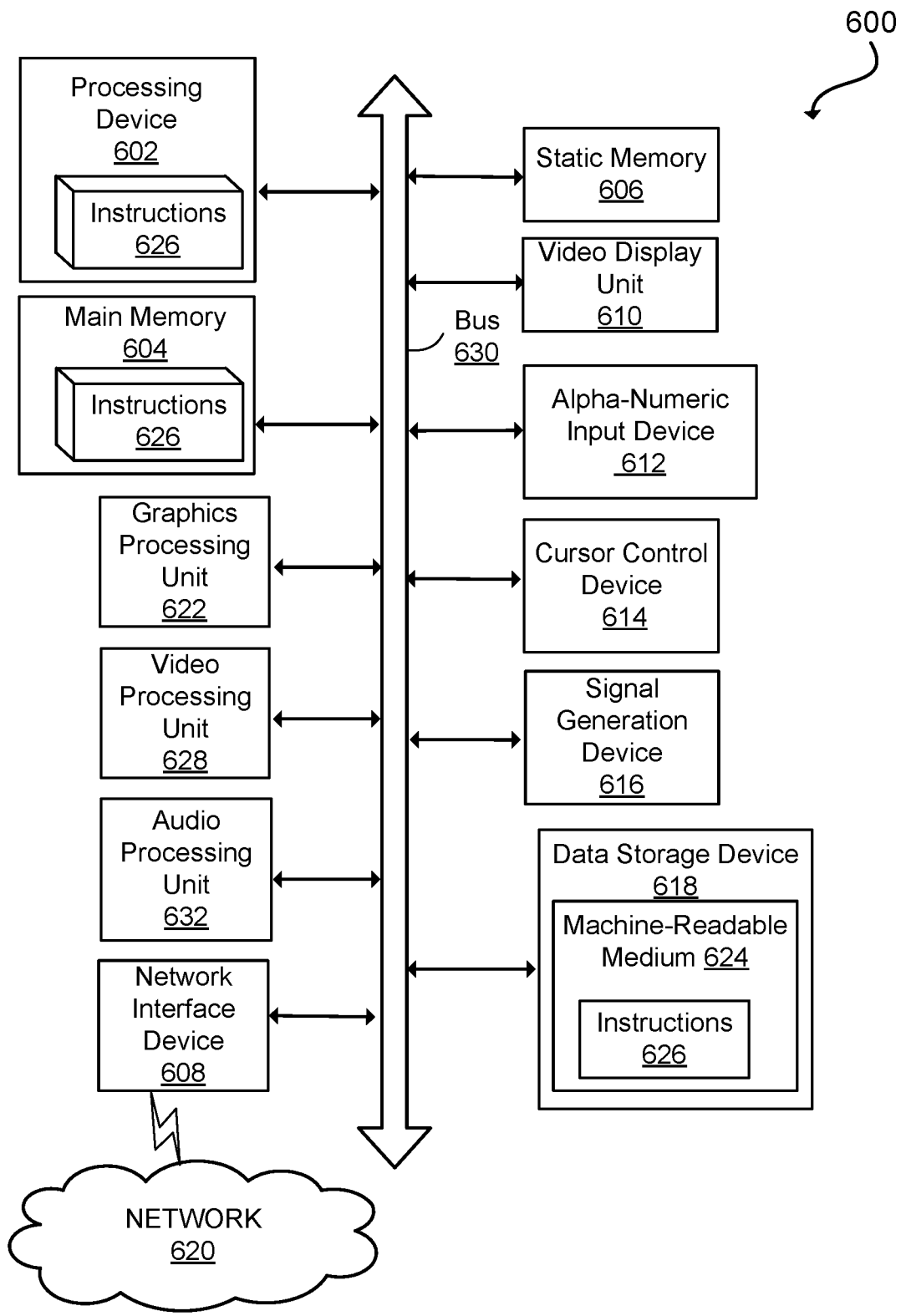
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 502 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    acquiring timing library data and sensitivity data for a physical parameter associated with a circuit cell;
    generating, by a processor, a timing behavior model for the circuit cell based on the timing library data and sensitivity data for the physical parameter, the timing behavior model being trained based on a current known measurement of a timing of a learning circuit different from the circuit cell; and
    generating, by the processor, updated timing data using the timing behavior model.

2. The method of claim 1, wherein generating the timing behavior model comprises:
    generating a timing path model based on a cell transition function model and a cell delay function model;
    determining an updated value for the physical parameter based on a calibration that reduces a difference between a timing computed by the timing path model and the current known measurement of the timing of the learning circuit; and storing the updated value for the physical parameter in a calibration database, wherein the calibration database is configured to be applied to a circuit design.

3. The method of claim 2, wherein generating the timing path model further comprises:

generating a machine learning training system as a function of arrival functions and one or more current known measurements for one or more types of the circuit cell.

4. The method of claim 1, further comprising:

acquiring data associated with the current known measurement from a silicon measurement, an aged silicon measurement, simulation results using another model, or simulation results at a different corner; and training the timing behavior model based on the data associated with the current known measurement.

5. The method of claim 1, further comprising:

selecting the physical parameter from a front end of line (FEOL) parameter and/or a back end of the line (BEOL) parameter.

6. The method of claim 5, wherein the FEOL parameter include per transistor type threshold voltage, mobility, and/or fin dimension.

7. The method of claim 5, wherein the BEOL parameter include per metal layer capacitance and/or resistance.

8. The method of claim 1, further comprising:

receiving a user input from a user to select the physical parameter; and determining the sensitivity data associated with the selected physical parameter from a SPICE model, wherein the sensitivity data includes a cell delay sensitivity and/or a cell output transition sensitivity.

9. The method of claim 1, further comprising:

receiving design data associated with a circuit design; and performing static timing analysis for the circuit design using the updated timing data.

10. A system comprising:

a memory storing instructions; and a processor, coupled with the memory and to execute the instructions, the instructions when executed cause the processor to:

acquire timing library data and sensitivity data for a physical parameter associated with a circuit cell;

generate a timing behavior model for the circuit cell based on the timing library data and sensitivity data for the physical parameter, the timing behavior model being trained based on a current known measurement of a timing of a learning circuit different from the circuit cell; and generate updated timing data using the timing behavior model.

11. The system of claim 10, wherein the processor is further configured to:

generate a timing path model based on a cell transition function model and a cell delay function model;

determine an updated value for the physical parameter that reduces a difference between a timing computed by the timing path model and the current known measurement of the timing of the learning circuit; and store the updated value for the physical parameter in a calibration database, wherein the calibration database is configured to be applied to a circuit design.

12. The system of claim 11, wherein the processor is further configured to:

generate a machine learning training system as a function of arrival functions and golden measurements for one or more types of the circuit cell.

13. The system of claim 10, wherein the processor is further configured to:

acquire data associated with the current known measurement from a silicon measurement, an aged silicon measurement, simulation results using another model, or simulation results at a different corner; and train the timing behavior model based on the data associated with the current known measurement.

14. The system of claim 10, wherein the processor is further configured to:

select the physical parameter from a front end of line (FEOL) parameter and/or a back end of the line (BEOL) parameter.

15. The system of claim 14, wherein the FEOL parameter include per transistor type threshold voltage, mobility, and/or fin dimension.

16. The system of claim 14, wherein the BEOL parameter include per metal layer capacitance and/or resistance.

17. The system of claim 10, wherein the processor is further configured to:

receive a user input from a user to select the physical parameter; and determine the sensitivity data associated with the selected physical parameter from a SPICE model, wherein the sensitivity data includes a cell delay sensitivity and/or a cell output transition sensitivity.

18. The system of claim 10, wherein the processor is further configured to:

receive design data associated with a circuit design; and perform static timing analysis for the circuit design using the updated timing data.

19. A non-transitory computer readable medium comprising stored instructions, which when executed by a processor, cause the processor to:

receive design data associated with a circuit design;

retrieve, from a calibration database,. one or more physical parameter values for a physical parameter of a cell of the circuit design; and perform static timing analysis for the circuit design using the one or more physical parameter values, wherein the one or more physical parameter values are determined using a timing behavior model that is trained to reduce a difference between a current known measurement of a timing of a learning circuit different from the cell of the circuit design and a static timing analysis timing of the learning circuit.

20. The non-transitory computer readable medium of claim 19, wherein the calibration database is generated using a learning circuit and wherein the one or more physical parameter values are calibrated values determined such that a difference between the current known measurement of a timing associated with the learning circuit and the static timing analysis timing for the learning circuit is reduced.

* * * * *